No. 857,128. PATENTED JUNE 18, 1907.
G. A. WATERS.
HORSE DETACHER.
APPLICATION FILED NOV. 3, 1906.

Witnesses

Inventor
George Alton Waters
By Victor J. Evans
Attorney

THE NORRIS PETERS CO., WASHINGTON, D. C.

UNITED STATES PATENT OFFICE.

GEORGE ALTON WATERS, OF ELDORADO, ILLINOIS.

HORSE-DETACHER.

No. 857,128.  Specification of Letters Patent.  Patented June 18, 1907.

Application filed November 3, 1906. Serial No. 341,940.

*To all whom it may concern:*

Be it known that I, GEORGE ALTON WATERS, a citizen of the United States of America, residing at Eldorado, in the county of Saline and State of Illinois, have invented new and useful Improvements in Horse-Detachers, of which the following is a specification.

This invention relates to horse detachers and one of the principal objects of the same is to provide simple, reliable and efficient means for detaching a horse from a vehicle in case of a runaway or in case the horse becomes unruly or frightened and bolts.

Another object of my invention is to provide a horse detacher which may be operated by means of a lever within the vehicle near the driver's seat to quickly detach the horse from the vehicle.

Still another object of the invention is to provide a horse detacher which can be quickly attached to any vehicle without change in the structure of the same.

Figure 1:
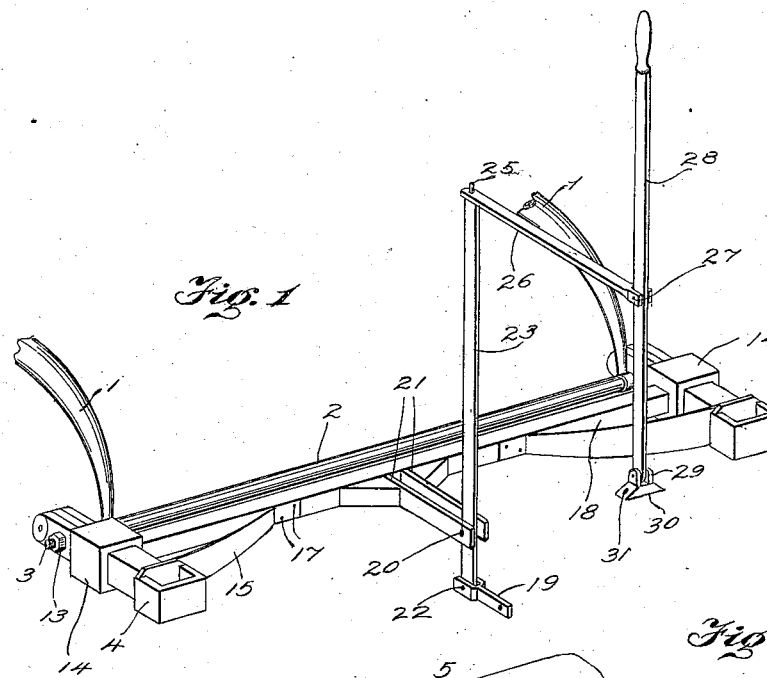
Figure 2:
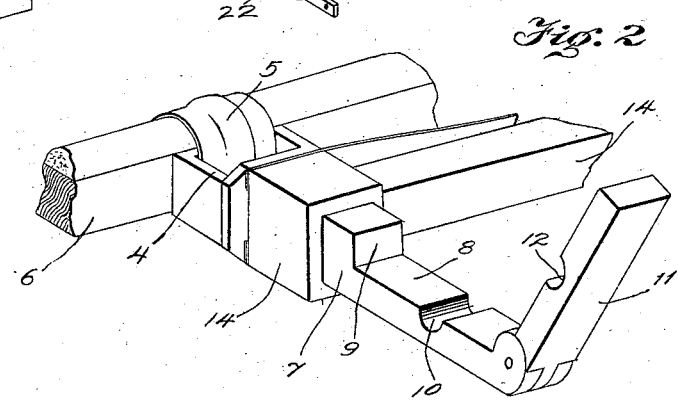
Figure 3:
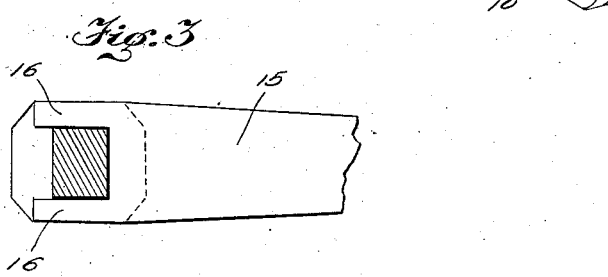

These and other objects may be attained by means of the construction illustrated in the accompanying drawing, in which:

Figure 1 is a perspective view of a horse detacher made in accordance with my invention. Fig. 2 is an enlarged detail perspective view of the releasing device and contiguous parts. Fig. 3 is a detail sectional view of the releasing device and the end of the spring for holding the releasing device in operative position.

Referring to the accompanying drawings for a more particular description of my invention, the numeral 1 designates the shafts or thills of a vehicle and 2 is the draw bar connecting the thills, said draw bar having outwardly extending end portions 3. The releasing device consists of a casting provided with a loop 4 through which a clip 5 is passed to secure the releaser to the front axle 6 of a vehicle. The releaser is also provided with a squared shank 7 which extends from the loop 4, said shank 7 being reduced in size, as at 8, and provided with a shoulder 9. In the reduced portion 8 is a semi-circular recess 10 and hinged to the outer end of the portion 8 is a keeper 11, said keeper having a semi-circular recess 12 which coincides with the recess 10 when the keeper 11 is closed down upon the portion 8, said recesses 10 and 12 adapted to inclose and secure the projecting ends 3 of the draw bar 2. Nuts 13 are applied to the threaded ends 3 of the draw bar 2 to prevent lateral movement of the thills. The shank 7 of the releaser is mounted to slide in a sleeve 14 and said sleeve, when in position to surround the keeper 11 and the shank 7, holds the projecting ends 3 of the draw bar in the recesses 10 and 12.

A flat leaf spring 15 provided with bifurcated outer ends 16 is secured at 17 to the front of a cross bar 18 and the outer bifurcated end of this spring bears against the loop 4 to hold the releaser in operative position. A link 19 adapted to be suitably connected to the front axle 6 of the vehicle is pivoted at 22 to a connecting bar 23 and said connecting bar is pivoted at 20 between a pair of spaced brackets 21 secured to the cross bar 18 and projecting rearwardly therefrom. The upper end 25 of the connecting bar 23 passes through a link 26 extending rearward and pivotally connected at 27 to an upright operating lever 28, the lower end of which is pivoted at 29 to a bracket 30 adapted to be secured through apertures 31 to the floor of the vehicle in rear of the dash board.

It will be understood, of course, that the releasing devices are duplicated at opposite ends of the cross bar 18.

The operation of my invention may be briefly described as follows: Should the animal attached to the vehicle become frightened and start to run away, the driver may pull the operating lever 28 backward which will push forward upon the link 19 thus pulling the sleeves 14 connected to the cross bar 18 backward against the tension of the spring 15 to release the keeper 11 and throw it in the position shown in Fig. 2, thus releasing the projecting ends 3 of the draw bar 2, thus detaching the animal from the vehicle.

From the foregoing it will be obvious that a horse detacher made in accordance with my invention may be readily attached to a vehicle without change in the structure in the same; that the detacher is of simple construction; of comparatively few parts, which cannot readily get out of order and will be found reliable and efficient for its purpose.

Having thus described the invention, what I claim is:

1. A horse detacher comprising a draw bar connected to the thills of a vehicle and provided with projecting ends, a releasing device, a keeper hinged thereto, a sleeve mounted to slide on the releaser and on said keeper, a cross bar to which the sleeve is attached, springs connected to the cross bar for holding the sleeve in position to engage the keeper, and a lever for moving the cross bar and sleeve against the tension of the spring to release the keeper.

2. A horse detacher comprising a cross bar, sleeves mounted thereon, a releasing device provided with a hinged keeper, springs for moving the sleeves into position for engaging keepers, and a lever for moving the cross bar and sleeves to release the keepers, substantially as described.

In testimony whereof, I affix my signature in presence of two witnesses.

GEORGE ALTON WATERS.

Witnesses:
H. L. JONES,
S. C. RITCHEY.